US006781920B2

(12) United States Patent
Bates et al.

(10) Patent No.: US 6,781,920 B2
(45) Date of Patent: Aug. 24, 2004

(54) METHOD FOR RESOLVING MEETING CONFLICTS WITHIN AN ELECTRONIC CALENDAR APPLICATION

(75) Inventors: Cary Lee Bates, Rochester, MN (US); Robert James Crenshaw, Apex, NC (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 10/005,933

(22) Filed: Dec. 5, 2001

(65) Prior Publication Data

US 2003/0103415 A1 Jun. 5, 2003

(51) Int. Cl.[7] .................. G04B 47/00; G04B 19/24; G06F 17/60
(52) U.S. Cl. .................. 368/10; 368/29; 368/41; 705/9; 708/112
(58) Field of Search .................. 705/8, 9; 368/10, 368/28, 29, 41–43; 708/111–112

(56) References Cited

U.S. PATENT DOCUMENTS

| | | | | |
|---|---|---|---|---|
| 4,831,552 A | * | 5/1989 | Scully et al. | 345/751 |
| 5,070,470 A | * | 12/1991 | Scully et al. | 345/705.8 |
| 6,167,379 A | * | 12/2000 | Dean et al. | 705/9 |
| 6,640,230 B1 | * | 10/2003 | Alexander et al. | 707/10 |

* cited by examiner

Primary Examiner—Vit W. Miska
(74) Attorney, Agent, or Firm—Dillon & Yudell, LLP

(57) ABSTRACT

A method for resolving meeting conflicts for an electronic calendar application is disclosed. After receiving a request for setting a first meeting schedule for a first meeting, an electronic calendar application sets a first meeting schedule and a first meeting priority number associated with the first meeting. In response to a request to set a second meeting schedule for a second meeting, and the second meeting schedule conflicts with the first meeting schedule, the electronic calendar application determines whether a second meeting priority number associated with the second meeting is higher than the first meeting priority number associated with the first meeting. If the second meeting priority number is determined to be higher than the first meeting priority number, then the electronic calendar application overrides the first meeting schedule with the second meeting schedule. Next, the electronic calendar application informs a meeting scheduler of that first meeting that the first meeting has been overridden by the second meeting schedule.

8 Claims, 2 Drawing Sheets

METHOD FOR RESOLVING MEETING CONFLICTS WITHIN AN ELECTRONIC CALENDAR APPLICATION

BACKGROUND OF THE INVENTION

1. Technical Field

The present invention relates to data processing in general, and in particular to electronic calendar applications that are capable of scheduling meetings. Still more particularly, the present invention relates to a method for resolving meeting conflicts within an electronic calendar application.

2. Description of the Prior Art

Today many people are relying on electronic calendar applications in data processing systems to schedule meetings. An electronic calendar application allows a person to coordinate individual daily schedules and to schedule meetings among other people also having their own individual electronic calendar applications. In order to schedule a meeting, a user may input desired meeting information such as a requester and any attendee with whom the requester wishes to meet. The user may also input one or more proposed dates, times and durations for the intended meeting. The electronic calendar application then accesses the electronic calendars of the requester and all the potential attendees, and determines whether or not they will be available to attend the intended meeting on the proposed dates, times and durations.

If a common proposed date, time and duration have been found for all potential attendees, the electronic calendar application of each potential attendee then places the meeting schedule on the potential attendee's individual electronic calendar. However, if any one of the potential attendee's electronic calendars shows that the potential attendee is unavailable because of a conflicting event on the potential attendee's electronic calendar at the proposed date, time and duration, then the electronic calendar application advises the user that the proposed meeting cannot, at that instant, be scheduled as requested.

Some electronic calendar applications, such as Lotus™ notes, allow any potential attendee to accept (or reject) the meeting invitation so that the user will know whether or not the potential attendees are planning to attend the meeting. However, there are often situations that prevent a potential attendee from attending a meeting that the potential attendee has previously accepted. One such situation is when another "more important" meeting suddenly comes up and the time of the "more important" meeting happens to coincide with the proposed meeting. When such situation arises, with the current electronic calendar applications, the user must rely on the potential attendee to be courteous enough to inform him/her of the renege of the previous acceptance of the proposed meeting. However, such courtesy is often not extended by some potential attendees. Consequently, it would be desirable to provide an improved method for resolving meeting conflicts within an electronic calendar application.

SUMMARY OF THE INVENTION

In accordance with a preferred embodiment of the present invention, after receiving a request for setting a first meeting schedule for a first meeting, an electronic calendar application sets a first meeting schedule and a first meeting priority number associated with the first meeting. In response to a request to set a second meeting schedule for a second meeting, and the second meeting schedule conflicts with the first meeting schedule, the electronic calendar application determines whether a second meeting priority number associated with the second meeting is higher than the first meeting priority number associated with the first meeting. If the second meeting priority number is determined to be higher than the first meeting priority number, then the electronic calendar application overrides the first meeting schedule with the second meeting schedule. Next, the electronic calendar application informs a meeting scheduler of that first meeting that the first meeting has been overridden by the second meeting schedule.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
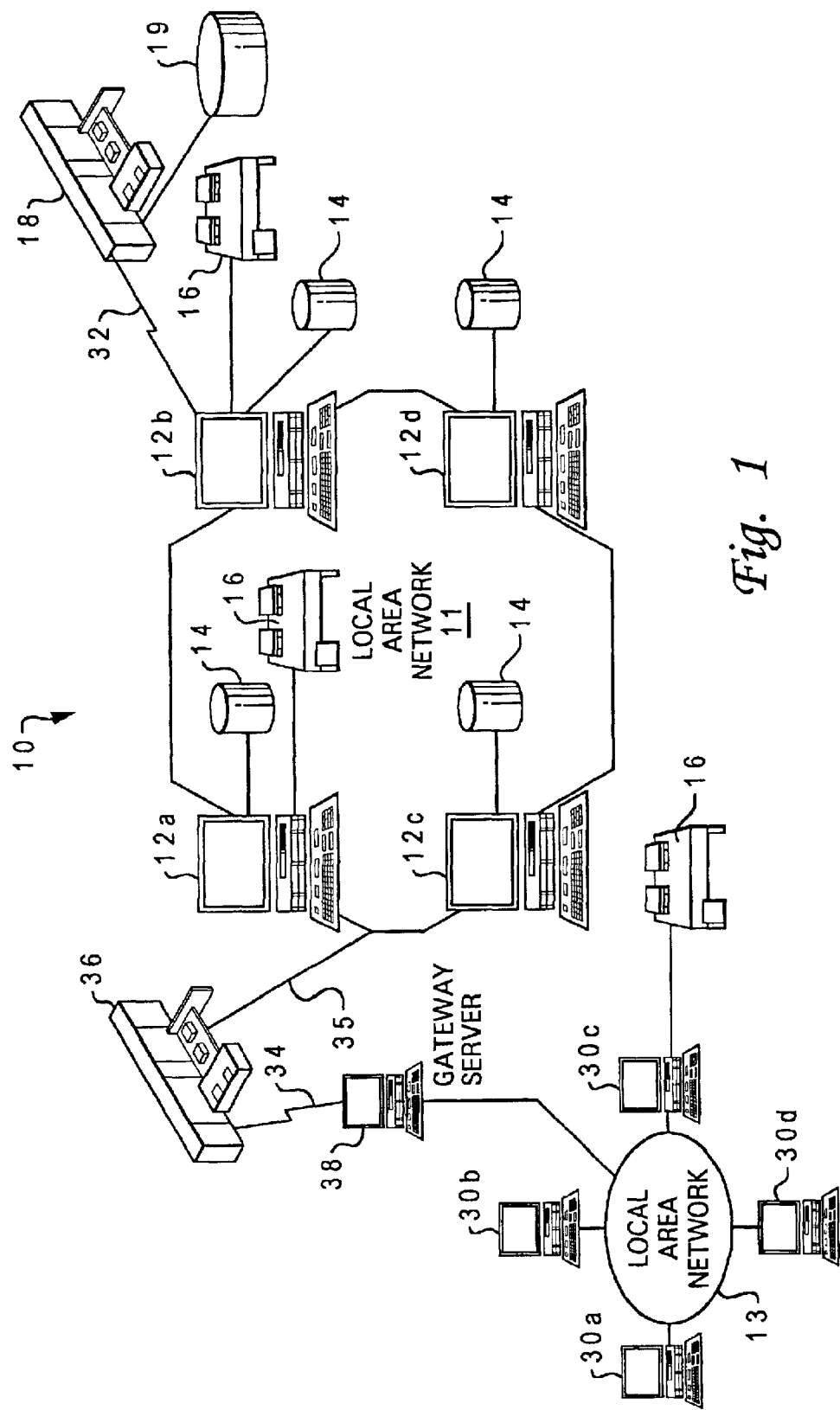
FIG. 1 is a pictorial representation of a computer network in which a preferred embodiment of the present invention is implemented.

Referring now to the drawings and in particular to FIG. 1, there is depicted a pictorial representation of a computer network in which a preferred embodiment of the present invention is implemented. As shown, a computer network 10 includes a local-area network 11 and a local-area network 13. Local-area networks 11 and 13 include computers 12a–12d and 30a–30d, respectively. Each of computers 12a–12d and 30a–30d may be coupled to a storage device 14 and/or an output device 16. Storage devices 14 are utilized to store various documents or software applications that may be addressed by a user of an individual computer within computer network 10. Computer network 10 may also include several mainframe computers, such as mainframe computers 18 and 36. Mainframe computer 18 is coupled to local-area network 11 by means of a communications link 32. Mainframe computer 18 is also coupled to a storage device 19 that serves as remote storage for local-area network 11. Mainframe computer 36 is coupled to local-area network 11 by means of a communications link 35. Mainframe computer 36 is also coupled to local-area network 13 by means of a communications link 34 and a gateway server 38. Gateway server 38 is preferably a computer or an intelligent workstation that serves to link local-area network 11 to local-area network 13.

In the present embodiment, computer network 10 also includes an electronic calendar application. The electronic calendar application preferably allows individual users, who may use individual computers within computer network 10, to maintain individual electronic calendars on computer network 10. Individual electronic calendars may also be maintained on computer network 10 for physical assets such as conference rooms. Each individual electronic calendar can accept individual electronic calendar events, and each of the accepted events may include a start date/time and either a stop time or a duration of the event on a particular day or days. Each electronic calendar event may also include information describing the location of the scheduled event.

The electronic calendar application of computer network 10 allows a person, such a meeting scheduler, to schedule meetings among users maintaining individual electronic calendars on computer network 10. In order to schedule a meeting, the meeting scheduler may input desired meeting attendees, such as a requester and the people with whom the requester wishes to meet. The meeting scheduler may also input one or more proposed dates, times and durations for the intended meeting. Instead of a duration, a stop time may be used. The electronic calendar application then accesses the electronic calendars of the potential attendees and determines whether they are available to attend the meeting on any of the proposed dates, times and durations.

If the potential attendees' electronic calendars show that all potential attendees are available at any one of the proposed dates, times and durations, the electronic calendar application places the meeting schedule on each potential attendee's electronic calendar, offering the potential attendee a choice when more than one meeting time is available. However, if one or more potential attendee's electronic calendars show that one or more of the potential attendees is unavailable because of a conflicting event on a potential attendee's electronic calendar at each of the proposed dates, times and durations, the electronic calendar application advises the meeting scheduler that the proposed meeting cannot, at that instant, be scheduled as requested.

In accordance with a preferred embodiment of the present invention, a calendar conflict notice can be sent to a first meeting scheduler when a first meeting scheduled by the first meeting scheduler has been scheduled over by a second meeting scheduled by a second meeting scheduler. Preferably, an entry associated with each invited attendee's electronic calendar can be flagged with a "notify-subsequent-overlap flag" such that a first meeting scheduler of a first meeting will be notified if the first meeting is subsequently scheduled over by a second meeting from a second meeting scheduler. Such notification can be implemented by several methods.

Figure 2:
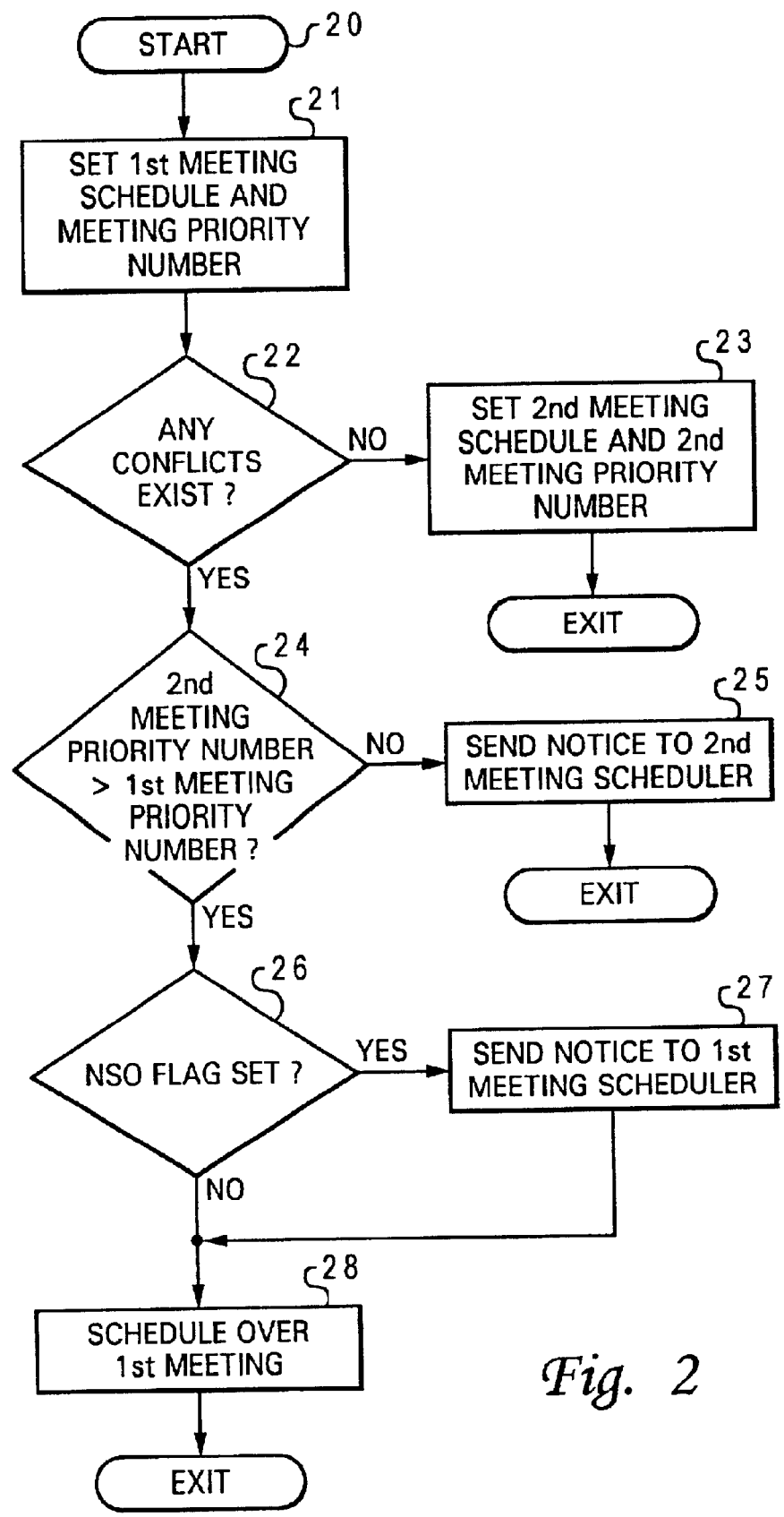
FIG. 2 is a high-level logic flow diagram of a method for resolving meeting conflicts within an electronic calendar application, in accordance with a preferred embodiment of the present invention.

With reference now to FIG. 2, there is illustrated a high-level logic flow diagram of a method for resolving meeting conflicts for an electronic calendar application, in accordance with a preferred embodiment of the present invention. Starting at block 20, a first meeting scheduler can enter a first meeting schedule along with a first meeting priority number for a first meeting intended for several potential attendees, into an electronic calendar application. In the present embodiment, a meeting priority number for a meeting is designated by a meeting scheduler, but a default meeting priority number can be assigned to a meeting according the position of the meeting scheduler within the management chain and/or the positions of the potential attendees. After confirming that there is no conflict with the first meeting schedule for all potential attendees, the electronic calendar application then sets the first meeting schedule along with the first meeting priority number at each of the potential attendees' electronic calendar, as shown in block 21. In response to an attempt by a second meeting scheduler (probably, but not necessarily, different from the first meeting scheduler) to assign a second meeting using a second meeting schedule and a second meeting priority number, a determination is made as to whether or not there is any schedule conflict between the first meeting schedule and the second meeting schedule, as depicted in block 22. If there is no schedule conflict between the first and second meeting schedules, the second meeting can be set with the second meeting schedule along with the second meeting priority number, as shown in block 23, and the process exits.

However, if there is a schedule conflict between the first and second meeting schedules, a determination is made as to whether or not the second meeting priority number is higher than the first meeting priority number, as depicted in block 24. If the second meeting priority number is lower than the first meeting priority number, then a no-scheduling notice is sent to the second meeting scheduler, stating the second meeting cannot be scheduled, as shown in block 25. In essence, the no-scheduling notice informs the second meeting scheduler that he/she did not succeed in luring the potential attendee(s) from the first meeting to the second meeting because the first meeting takes priority. The no-scheduling notice can also be sent to any of the potential attendees.

If the second meeting priority number is higher than the first meeting priority number, then the second meeting schedule can be set by the electronic calendar application. But before overlapping the first meeting schedule, another determination is made as to whether a notify-subsequent-overlap flag is set, as depicted in block 26. If the notify-subsequent-overlap flag is set, a meeting overlap notice is sent to the first meeting scheduler to inform him/her that the first meeting has been scheduled over by the second meeting, as shown in block 27. In essence, the meeting overlap notice serves as a courtesy note to the first meeting scheduler, stating that the first meeting has been scheduled over by the second meeting for one or more attendees. In addition to indicating what the agenda of the second meeting is, the meeting overlap notice may also include which attendees' calendars have been scheduled over. An option of not notifying the first meeting scheduler until at least one affected attendee actually accepts the second meeting invitation may be included. Finally, the first meeting schedule is overridden by the second meeting schedule, as depicted in block 28.

Even though the first meeting schedule has been overridden by the second meeting schedule, the first meeting schedule still remains on an attendee's electronic calendar as an inactive meeting schedule. If the second meeting, which has been accepted by an attendee, is subsequently cancelled or moved, then the previously overridden first meeting schedule will be automatically re-evaluated by the electronic calendar application. If the inactive first meeting schedule shows no schedule conflict with other meeting schedules, then meeting notifications for the first meeting will be re-sent to the same group of potential attendees allowing them to accept (or reject) the first meeting again. A notification could also be sent to the first meeting scheduler to inform him/her that the first meeting is now active again.

In addition, an attendee can also designate a meeting priority on his/her own electronic calendar that he/she actually plans to attend, regardless of the meeting priority number designated by the meeting scheduler during meeting scheduling. Thus, attendees have the right to override how others are trying to prioritize their time. An attendee can override situations when a meeting scheduler who erroneously claims a certain meeting is critical or when the default meeting priority number may have been wrong. If an attendee decided to override a scheduled meeting, prior meeting notifications can be retracted or update meeting notifications can be sent.

As has been described, the present invention provides a method for resolving meeting conflicts within an electronic calendar application via notifications.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for resolving meeting conflicts for an electronic calendar application, said method comprising:

in response to a request from a first meeting scheduler to set a first meeting schedule for a first meeting, setting said first meeting schedule and a first meeting priority number associated with said first meeting on an electronic calendar of an attendee;

in response to a request from a second meeting scheduler to set a second meeting schedule for a second meeting, wherein second meeting schedule conflicts with said first meeting schedule, determining whether a second meeting priority number associated with said second meeting is higher than said first meeting priority number;

in a determination that said second meeting priority number is higher than said first meeting priority number, overriding said first meeting schedule with said second meeting schedule;

informing said first meeting scheduler that said first meeting has been overridden.

2. The method of claim 1, wherein said informing further includes informing said first meeting scheduler that said first meeting has been overridden after said attendee has accepted said second meeting schedule.

3. The method of claim 1, wherein said method further includes resending notification to said first meeting scheduler if said second meeting has been cancelled.

4. The method of claim 1, wherein said method further allows an said attendee to state a personal priority number to said electronic calendar, wherein said person priority number can override said first and second meeting priority numbers.

5. A computer program product residing on a computer usable medium for resolving meeting conflicts for an electronic calendar, said computer program product comprising:

program code means for setting a first meeting schedule for a first meeting and a first meeting priority number associated with said first meeting on an electronic calendar of an attendee, in response to a request from a first meeting scheduler to set said first meeting schedule for said first meeting;

program code means for determining whether a second meeting priority number associated with a second meeting is higher than said first meeting priority number, in response to a request from a second meeting scheduler to set said second meeting schedule for said second meeting, wherein said second meeting schedule conflicts with said first meeting schedule;

program code means for overriding said first meeting schedule with said second meeting schedule, in a determination that said second meeting priority number is higher than said first meeting priority number;

program code means for informing said first meeting scheduler that said first meeting has been overridden.

6. The computer program product of claim 5, wherein said program code means for informing further includes program code means for informing said first meeting scheduler that said first meeting has been overridden after said attendee has accepted said second meeting schedule.

7. The computer program product of claim 5, wherein said computer program product further includes program code means for resending notification to said first meeting scheduler if said meeting has been cancelled.

8. The computer program product of claim 5, wherein said computer program product further includes program code means for allowing said attendee to state a personal priority number to said electronic calendar, wherein said person priority number can override said first and second meeting priority numbers.

* * * * *